United States Patent
Vitikainen et al.

(10) Patent No.: US 7,809,578 B2
(45) Date of Patent: Oct. 5, 2010

(54) MOBILE DEVICE HAVING VOICE USER INTERFACE, AND A METHOD FOR TESTING THE COMPATIBILITY OF AN APPLICATION WITH THE MOBILE DEVICE

(75) Inventors: Timo Vitikainen, Espoo (FI); Peter Boda, Helsinki (FI)

(73) Assignee: Nokia Corporation, Espoo (FI)

( * ) Notice: Subject to any disclaimer, the term of this patent is extended or adjusted under 35 U.S.C. 154(b) by 1291 days.

(21) Appl. No.: 10/521,626

(22) PCT Filed: Jul. 17, 2002

(86) PCT No.: PCT/IB02/02848

§ 371 (c)(1),
(2), (4) Date: Jan. 13, 2005

(87) PCT Pub. No.: WO2004/008434

PCT Pub. Date: Jan. 22, 2004

(65) Prior Publication Data

US 2006/0052080 A1    Mar. 9, 2006

(51) Int. Cl.
*G10L 15/00* (2006.01)
(52) U.S. Cl. .................... 704/275; 704/270; 379/88.01
(58) Field of Classification Search ............. 704/275, 704/270; 379/88.01
See application file for complete search history.

(56) References Cited

U.S. PATENT DOCUMENTS

| | | | | |
|---|---|---|---|---|
| 6,208,336 B1* | 3/2001 | Carter | ........................ | 715/866 |
| 6,408,272 B1* | 6/2002 | White et al. | ............. | 704/270.1 |
| 6,513,009 B1* | 1/2003 | Comerford et al. | .......... | 704/270 |
| 7,024,363 B1* | 4/2006 | Comerford et al. | .......... | 704/270 |
| 7,137,126 B1* | 11/2006 | Coffman et al. | ............. | 719/328 |
| 7,149,695 B1* | 12/2006 | Bellegarda | .................. | 704/275 |
| 2001/0011028 A1 | 8/2001 | Wendelrup | .................. | 455/563 |
| 2002/0046030 A1 | 4/2002 | Haritsa et al. | ............... | 704/256 |
| 2002/0077828 A1 | 6/2002 | Robbins | .................. | 704/270.1 |
| 2002/0077829 A1* | 6/2002 | Brennan et al. | ............. | 704/275 |
| 2003/0046401 A1* | 3/2003 | Abbott et al. | ............... | 709/228 |

FOREIGN PATENT DOCUMENTS

| | | | |
|---|---|---|---|
| EP | 1 104 155 A2 | | 5/2001 |
| EP | 1 104 155 A3 | | 11/2002 |
| GB | 2 353 918 A | | 3/2001 |
| WO | WO 00/20962 | * | 4/2000 |

(Continued)

*Primary Examiner*—Daniel D Abebe
(74) *Attorney, Agent, or Firm*—Harrington & Smith

(57) ABSTRACT

A mobile device or MS having voice user interface (UI) as part of its multimodal input/output capabilities is provided with a storage area for storing a profile indicating the voice UI capabilities. The profile indicates the automatic speech recognition, text-to-speech, vocabulary and grammar capabilities, amongst others. An application, such as a diary program or one allowing entry into a lotto, is initialized on the MS with reference to the profile. When the application is run, the profile is referred to such that parts of the application which are appropriate to the profile are run whilst those which are inappropriate to the profile are not run. Alternatively, the application may be run on a voice UI application server forming part of a base station. An emulator for testing an application using a profile of a target device is also disclosed.

25 Claims, 5 Drawing Sheets

FOREIGN PATENT DOCUMENTS

| WO | WO 01/26093 | A1 | 4/2001 |
| WO | WO 01/45086 | A2 | 6/2001 |
| WO | WO 01/50453 | A2 | 7/2001 |
| WO | WO 01/95312 | A1 | 12/2001 |
| WO | WO 02/054746 | A1 | 7/2002 |

* cited by examiner

MOBILE DEVICE HAVING VOICE USER INTERFACE, AND A METHOD FOR TESTING THE COMPATIBILITY OF AN APPLICATION WITH THE MOBILE DEVICE

FIELD OF THE INVENTION

This invention relates to a method of operating a mobile device, to a mobile device, to a system, to a method of and to apparatus for testing the compatibility of an application with a mobile device.

BACKGROUND ART

A current trend with mobile devices, and in particular mobile telephones and personal digital assistants (PDAs), is to provide them with multimodal interaction capabilities. Following this trend, it is anticipated by the inventors that some new devices will soon be provided with voice user interface capabilities. Such capabilities are expected to include text-to-speech (TTS) synthesis, which would allow a terminal to 'speak' text stored in a memory within itself or received over a communications channel and/or to play pre-recorded wave files, and automatic speech recognition (ASR), which would allow a terminal to understand instructions and information spoken by a user. However, such features would require considerable processing resources, and possibly also relatively large databases, which would present problems for developers of applications having voice user interface features.

SUMMARY OF THE INVENTION

According to one aspect of the invention, there is provided a method of operating a mobile device, the method comprising: maintaining a profile of voice user interface capabilities associated with the device; storing an application having voice user interface features on the device or on a server in communication with the device; examining at least part of the profile; and using voice user interface features of the application which are appropriate to the profile and refraining from using inappropriate features.

The using step typically effects control of a speaker and/or a microphone.

According to a second aspect of the invention, there is provided a mobile device, comprising: a storage device for maintaining a profile of voice user interface capabilities associated with the device; a reader for examining at least part of the profile; and an application runner arranged to run an application using voice user interface features of the application which are appropriate to the profile and to refrain from using inappropriate features.

According to a third aspect of the invention, there is provided a system comprising: a mobile device having voice user interface capabilities; and a server, capable of communicating with the mobile device, the server being arranged to examine at least part of a profile voice user interface capabilities associated with the mobile device, and to run an application using voice user interface features of the application which are appropriate to the profile and to refrain from using inappropriate features.

According to a fourth aspect of the invention, there is provided a method of testing the compatibility of an application with a mobile device, the method comprising: maintaining a profile of voice user interface capabilities associated with the device; controlling an emulator to emulate the voice user interface features of the device using at least part of the profile; and running the application on the emulator.

According to a fifth aspect of the invention, there is provided apparatus for testing the compatibility of an application with a mobile device, the apparatus comprising: a reader for reading at least part of a profile of voice user interface capabilities associated with the device; and an emulator for emulating the voice user interface features of the device using the at least part of the profile, and for running the application.

Running the application typically effects control of a speaker and/or a microphone.

Embodiments of the invention will now be described, by way of example only, with reference to the accompanying drawings.

DETAILED DESCRIPTION OF THE PREFERRED EMBODIMENTS

Figure 1:
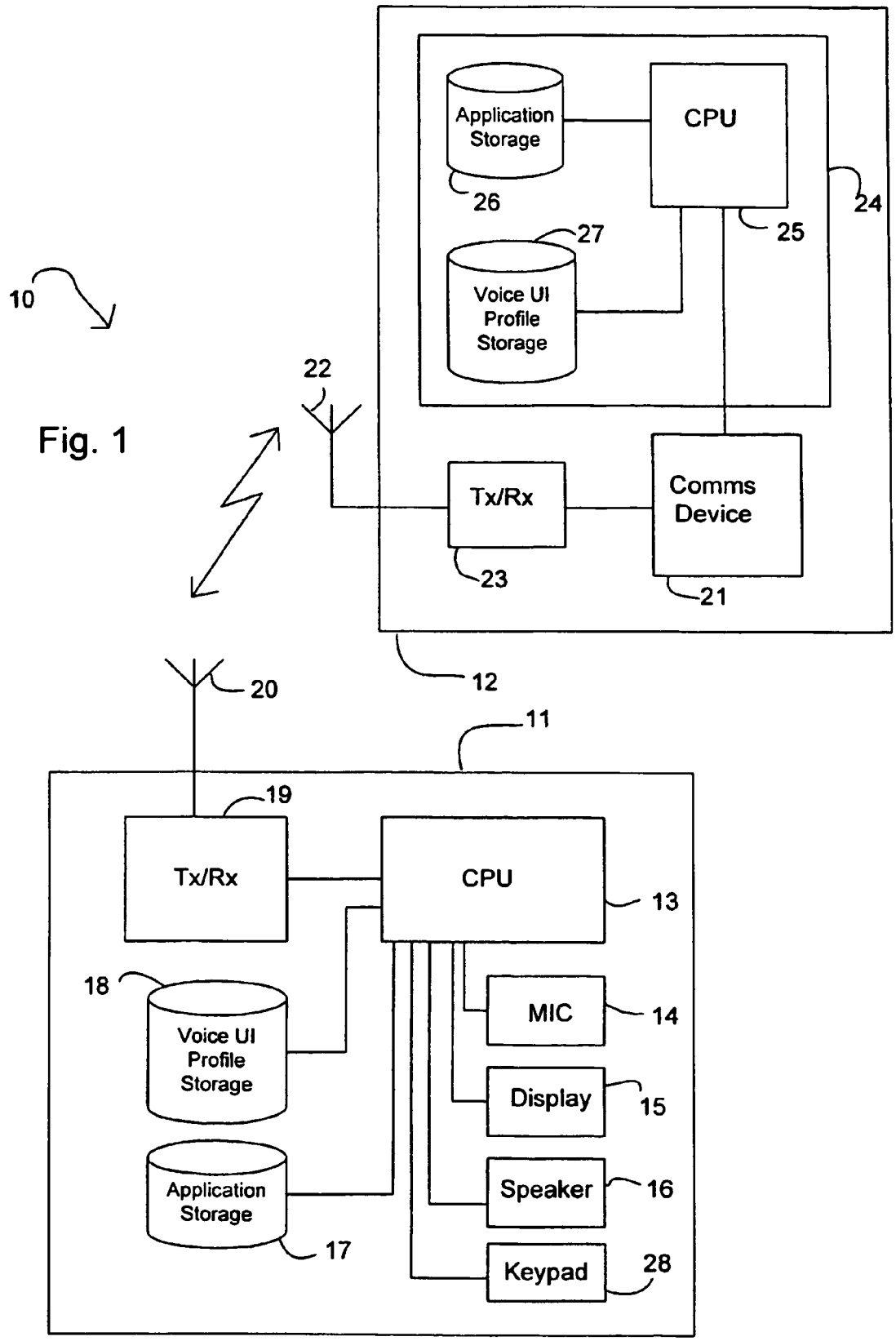
FIG. 1 is a schematic diagram of a system including a mobile station and a base station, according to certain aspects of the invention.

Referring firstly to FIG. 1, a system 10 is shown comprising a mobile station (MS) 11 and a base station (BS) 12, both of which are configured to operate as part of the universal mobile telephone system (UTMS). The MS 11 may be a mobile telephone handset, a personal digital assistant (PDA) or any other suitable device. The MS 11 is provided with multimodal input/output capabilities. The MS 11 includes a central processing unit (CPU) 13, which is connected via respective connections to each of a microphone 14, a display 15, a speaker 16, a keypad or keyboard 28, an application storage device 17, a voice user interface (UI) profile storage device 18 and a transceiver 19. An antenna 20 is connected, via the transceiver 19, to the CPU 13, thereby allowing it to communicate with devices external to the MS 11. The storage devices 17 and 18 may take any convenient form, such as RAM, EEPROM, magnetic storage etc., and may be constituted by the same physical storage device. The MS 11 also includes other features typical of its type, but these are not shown for the sake of clarity.

The BS 12 comprises a communications device 21, which includes all of the standard processing hardware and software found in a conventional BS, and which is connected to an antenna 22 via a transceiver 23, and to voice UI application server 24. Included in the voice UI application server 24 is a CPU 25, which is connected to each of an application storage device 26 and a voice UI profile storage device 27 also forming part of the server. It is the CPU 25 of the voice UI application server 24 which is connected to the communications device 21, to allow communication therebetween. As is usual, the BS 12 is also connected to communicate with a large network, such as the Internet or PSTN.

The BS 12 is capable of communicating with the MS 11 using signals according to the UMTS standard, although any other communications protocol, such as GSM, Bluetooth, PSN or any of the Japanese, Canadian or US standards, etc., may be used instead.

An example of a voice UI profile associated with the MS 11, and stored in the voice UI profile storage device 18, will now be provided. The voice UI profile is divided into a number of sections including but not limited to a general section, a speech recognition section, a speech synthesis section, an input section, an output section, and a dialogue section. In this example, the general section includes amongst other information the following:

device.complexity=BIG_TERMINAL
    device.profile_last_modified=04.07.2002 from which it can be deduced that the MS 11 has voice UI capabilities in the class 'big terminal' and that the profile was last modified on 4 Jul. 2002. In the speech recognition section, the voice UI capabilities of the MS 11 relating to automatic speech recognition (ASR) are identified thus:

asr.lang_1=UK_english
    asr.lang_2=finnish
    asr.grammar.lang_1=bigram1
    asr.grammar.lang_2=stochastic_grammar
    asr.max_words=500
    asr.natural language_understanding=no
    asr.multilingual=no
    asr.barge_in=no
    asr.vocab.lang_1=english_vocab
    asr.vocab.lang_2=finnish_vocab From this, it can be deduced that the MS 11 has UK English language capabilities with a grammar file named as bigram 1 and Finnish language capabilities with a language model stored in a file named stochastic grammar, that it has a vocabulary of each of the languages UK English and Finnish; that it has no natural language, multilingual or barge-in capabilities; and that it is able to handle a maximum of 500 words of vocabulary at a time.

The MS 11 has text-to-speech (TTS) capabilities of a formant synthesis type in UK English and in Finnish, and this information is given by the following information, which forms a speech synthesis section:

tts.lang_1=UK_English
    tts.lang_2=finnish
    tts.type=formant-synthesis
    Also, from the input section:
    input.mic=yes
    input.keyboard=yes it can be seen that the MS 11 can receive inputs from the microphone 14 and from the keyboard 28.

With this voice UI profile, it is implicit that the MS 11 does not have the capability to accept inputs from any kind of input device which is not listed as being accepted. For example, the MS 11 does not in this embodiment have the capability to accept inputs provided by a mouse or by a stylus. The same applies to output devices, e.g. the output section following allows for speaker and display outputs but not for vibration outputs:

output.speaker=yes
    output.display=yes
    The following appears in the dialogue section:
    dialogue.strategy=system_driven
    dialogue.verification=explicit
    dialogue.maximum_trials=3
    dialogue.maximum_timeout=10 from which it can be determined that the MS 11 has system driven strategy capabilities, that it is limited to explicit verification, with a maximum of 3 trials and a timeout of 10 seconds. The timeout value relates to the time that the ASR will wait for a user input before returning an error message to the user.

The voice UI profile is stored as a file in ASCII or in binary form, although it could equally well be stored in a scripting language for VoiceXML, SALT, or in a style sheet. Access to modify the voice UI profile by a user of the MS 11 is very limited, is less limited to an operator of the system 10, and equipment manufacturers have full modification access. Allowing access to the voice UI profile provides the possibility for pre-defining what types of multimodal input/output features are to be run on the MS.

The voice UI profile thus describes fully the voice UI capabilities of the MS 11. To run an application having voice UI features on the MS 11, the voice UI profile is examined to see which features are usable with the MS. This will now be described further with reference to FIG. 2.

Figure 2:
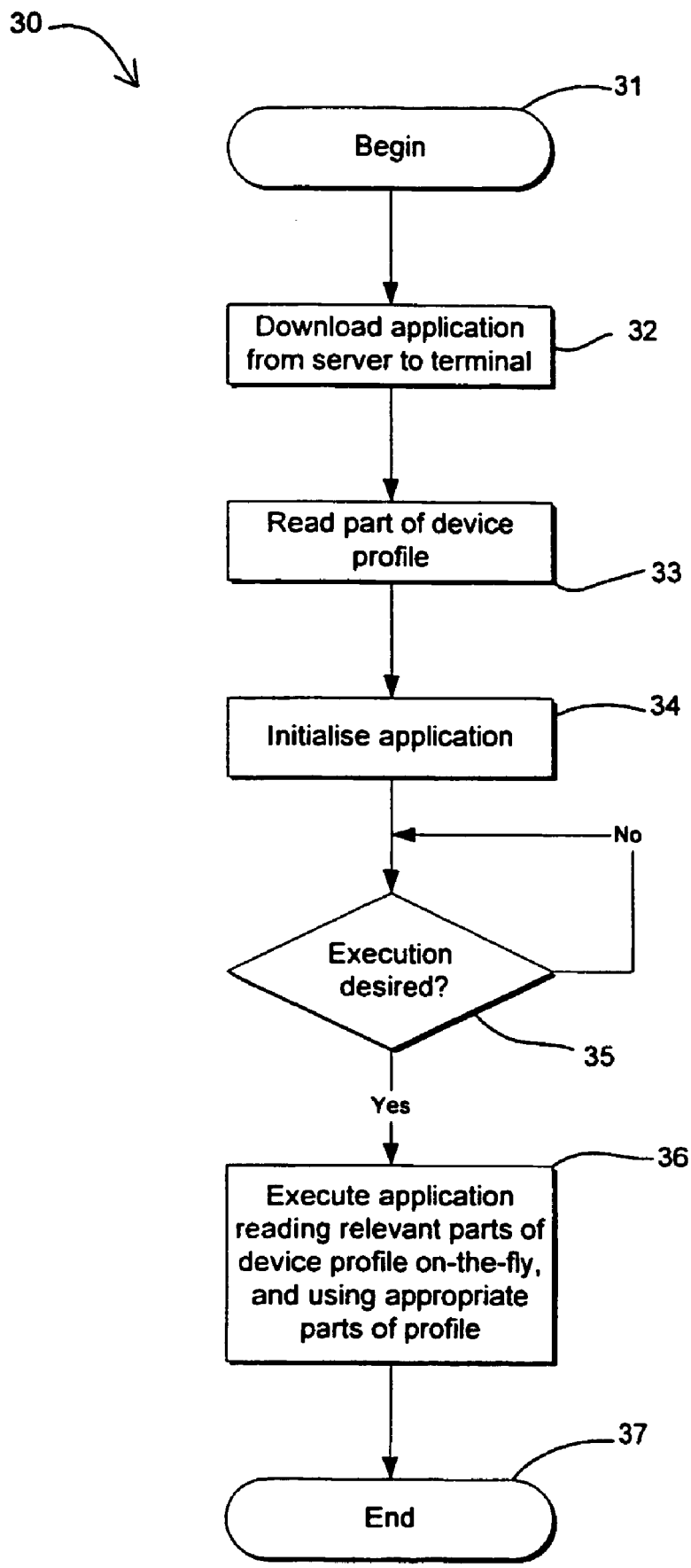
FIG. 2 is a flow chart illustrating operation of the mobile station of FIG. 2.

Referring to FIG. 2, an operation 30 begins in response to a user input at step 31 by downloading an application to be run on the MS 11 from the voice UI application server 24. In this example, the voice UI profile storage device 27 is not used, and the only purpose of the server 24 is to provide the application for downloading over-the-air to the MS 11. The application may be any computer program, such as a program for maintaining a diary system or a program for allowing entry to a lottery or lotto. The CPU 13 stores the downloaded application in the application storage device 17.

At step 32, a part of the voice UI profile is read from the voice UI profile storage device 18, this part including the information required for initialisation of the application. These parts may include device complexity, ASR languages supported, grammar and vocabulary information. Initialisation then occurs at step 33. If the application has been downloaded at an earlier time, then the downloading step 31 is omitted, as is the initialising step 32 if the application has already been initialised. Step 34 then causes the operation 30 to remain frozen until it is determined that it is required to execute or run the application, at which time progress is made to step 35. Here, the application is executed by the CPU 13. During execution, the CPU 13 uses the application as initialised, and refers to the voice UI profile, by reading the profile from the storage device 18, when a determination needs to be made as to whether or not a feature is supported by the MS 11.

During execution, many of the instructions given by the application are executable without any voice UI capability information or are executable with the information provided during initialisation.

However, there are also instructions which require recourse to the voice UI profile. The following, given at algorithmic level rather than in any programming language, is an example of this:

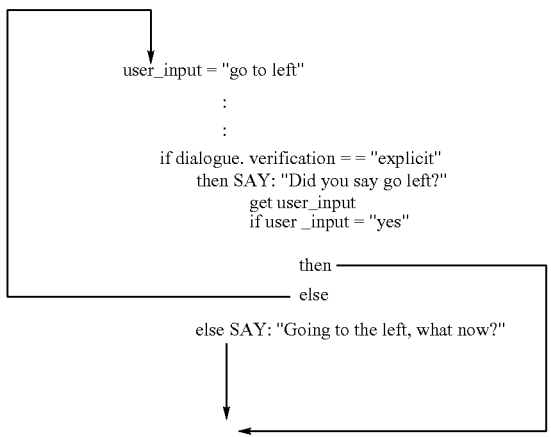

As can be seen, certain instructions are decisions which require input from the voice UI profile. In the above illustration, the CPU 13 must determine whether the dialogue verification capabilities require explicit verification. Since the MS 11 does require explicit verification (see the dialogue section of the profile above), the CPU 13 uses TTS to ask a user "Did you say go to left?" and follows the instructions on the remainder of that sub-branch of the application. If this same application was run on an MS (not shown) which did not require explicit verification, then the sub-branch including the instruction to say "Did you say go to left?" would not be implemented. Instead, the instruction to say "Going to left, what now?" would be implemented, whereas this would not be the case with the MS 11.

Another example of a part of an application is given here:

if.tts.type==pre-recorded prompt
    SAY: welcome_prompt
else
    SAY: "Hello, how can I help you?"

Thus, it will be seen that the first SAY instruction is run or used only if the TTS capabilities of a terminal on which the application is run are limited to pre-recorded prompts. In this case, the SAY instruction plays a pre-recorded voice (e.g. amr, wav, etc) file. The second SAY instruction is run only if the TTS capabilities are not so limited, i.e. full TTS capabilities are present. In this latter case, the text in the SAY instruction is provided to a TTS engine for synthesis.

It will be appreciated, therefore, that provision of the voice UI profile allows the CPU 13 to use only parts or features of the application which are appropriate to the voice UI capabilities of the MS 11, and to refrain from using parts or features of the application which are inappropriate. It will also be appreciated that the voice UI capabilities of the MS 11 are defined in the voice UI profile, so that using parts or features of an application which are appropriate to the profile is the same as using parts or features which are appropriate to the MS 11.

This allows application development to be a straightforward matter, especially since it is not necessary to design a different version of an application for each of the different possible combinations of voice UI capabilities. This also has significant advantages for the user of the MS 11 since no decision has to be made as to which version of the application to buy or download, and no signalling of the voice UI capabilities of the MS 11 is necessary before the downloading of an application from an application server.

Furthermore, a single application can run seamlessly on whatever form of MS a user might have, making the application more attractive to use. A user might transfer the application from one MS to another MS having different voice UI capabilities, and run or use the application on that other MS, which would not necessarily be possible if the application was designed specifically to function to the best ability of the first mentioned MS.

A diary application when run on an MS having natural language voice input capabilities might accept an instruction such as "contact Matti Nokialainen and inform him that our meeting will start an hour late at 2 pm" and take the necessary actions. Running the same diary application on an MS having only finite state grammar capabilities might result in the following dialogue:

MS: Please say e-mail, calendar or reschedule,
User: Reschedule,
MS: You have a meeting today with Matti Nokialainen at 1 pm and with John Smith at 3 pm, which meeting do you want to reschedule?
User: with Matti Nokialainen,
MS: And to what time?
User: 2 pm,
MS: I will inform Matti Nokialainen that the meeting will start at 2 pm, As application having instructions for both of the above possibilities may require less development resources than would be required to develop two applications, one for each possibility. Of course, the savings increase as the number of combinations of different voice UI capability features increases.

Some aspects of the functioning of the application on the MS 11 are defined by the voice UI profile and by the application together. An example of this is the vocabulary supported by an application allowing entry into a lottery or lotto. Here, the application defines acceptable vocabulary using proper syntax to convey the following:

| POLITE_EXPRESSIONS: | |
|---|---|
| could you please | BIG_TERMINAL |
| would you | BIG_TERMINAL |
| can I | BIG_TERMINAL |
| is it | BIG_TERMINAL |
| possible | BIG_TERMINAL |
| I want | |
| . | |
| . | |
| . | |
| LOTTO: | |
| combination | BIG_TERMINAL |
| one | |
| two | |
| three | |
| four | |
| . | |
| . | |
| . | |
| numbers | |
| BYE: | |
| good bye | BIG_TERMINAL |
| that's it | BIG_TERMINAL |
| thanks | |
| bye | |
| exit | |

-continued

| | |
|---|---|
| I want to finish | BIG_TERMINAL |
| Enough | BIG_TERMINAL |
| . | |
| . | |
| . | |

In running an application including the above vocabulary section, the CPU 13 examines the device complexity term in the general section of the voice UI profile to determine whether or not the MS 11 has big terminal capabilities, which in this example it does (see the general section above). Accordingly, all of the terms given in the vocabulary section are available for use by the application, and the CPU 13 works with the application to make all of the vocabulary available. If, on the other hand, the MS 11 did not have big terminal complexity, then the CPU 13 and the application would make available for use only the terms which are not specified to be big terminal terms.

A similar scheme is applied to the language model, or grammar. There are two main types of grammar, namely statistical grammar and context free (task) grammar. Statistical grammar is best suited to applications with large speech recognition vocabularies. It includes normalised frequencies of occurrences of word pairs (and occasionally word triples). The frequencies may be included in the application as in the following example:

| | | |
|---|---|---|
| exit | thank you | 0.018 |
| | bye bye | 0.021 |
| | thanks goodbye | 0.029 |
| . | | |
| . | | |
| . | | |
| message | send message | 0.03 |
| | text message | 0.028 |

From this it can be seen that the probability of two words in an 'exit' section of an application being 'thank' and 'you' in that order is 0.018. It will be obvious that use of statistical grammar can result in a large amount of information, since the number of pairs increases exponentially with the size of the vocabulary.

Task grammar is simpler in that it includes a compact notation of possible phrases. An example of how semantic labels (in bold) are returned by a task grammar follows:

```
<what>=
(send [a]) (message: message | SMS: message| (short |
text) message: message|email: email|mail: email|
electronic mail: email) |
([his] | [her]) (info: info|business card: info|information:
info|some info: info) |
exit: exit|[bye] bye: exit|[thanks] goodbye: exit|
thank you goodbye: exit|
```

Here, '|' denotes an exclusive or operation,
'()' refers to a grouping, and
'[]' denotes an optional occurrence.

However, the performance of task grammar is not usually as good as that of statistical grammar, although it is considered suitable for use in many types of application. The use of statistical grammar is generally preferred where the MS on which the application is to be run has the necessary capabilities.

The voice UI profile associated with the MS 11, as well as being stored in the MS, may be stored at a central location on the network, for example at a voice UI profile storage device (not shown) associated with the home BS of the MS.

Figure 3:
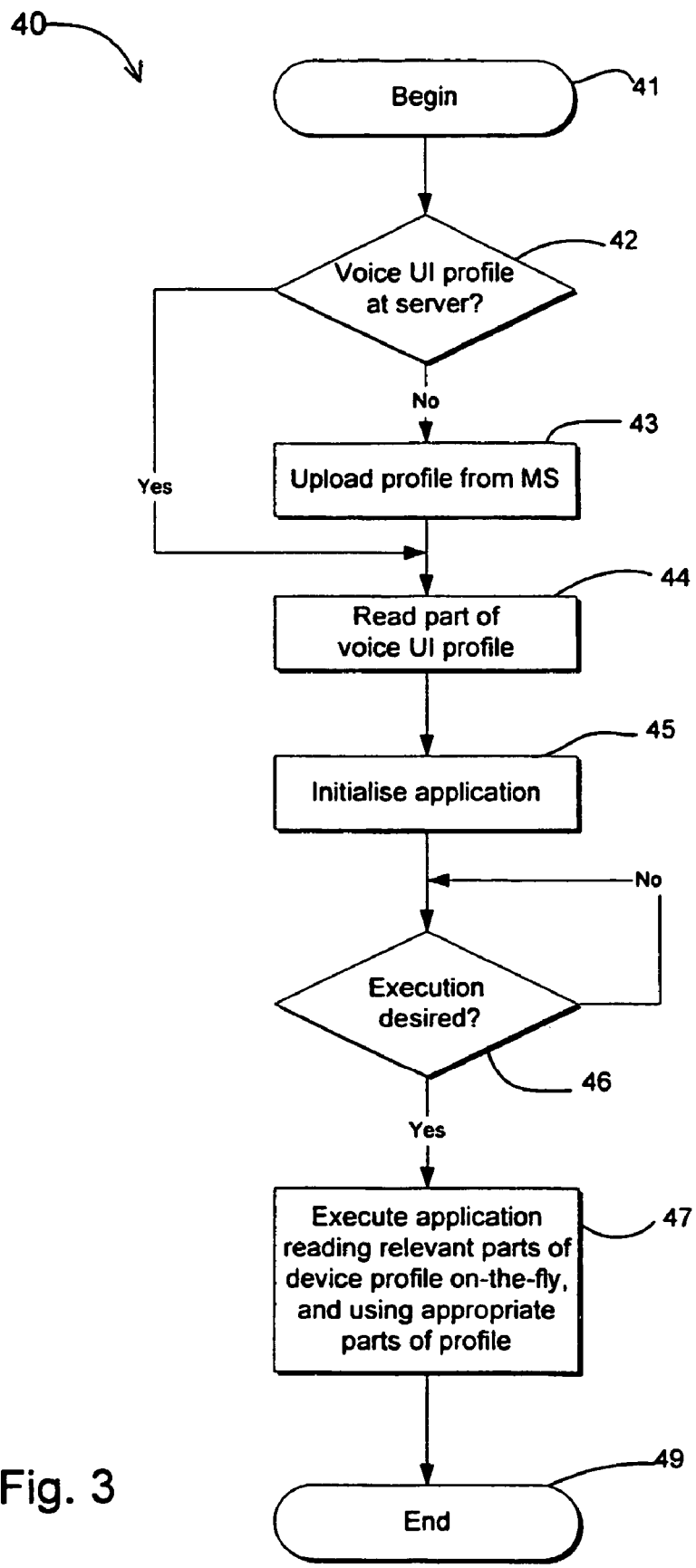
FIG. 3 is a flow diagram illustrating operation of the FIG. 1 system.

In another embodiment shown in FIG. 3, an application is stored on the application storage device 26 of the server 24 which is included at the BS 12, rather than at the MS 11.

Referring to FIG. 3, an operation 40 commences at step 41, then at step 42 determines whether the voice UI profile for the MS 11, with which the application is to be associated, is stored in the voice UI profile storage 27. If a negative determination is made, the voice UI profile for the MS 11 is uploaded from the MS and then stored in the voice UI profile storage 27 at step 43, following which the operation 40 proceeds to step 44. Otherwise, the operation proceeds to step 44 without carrying out step 43. A part of the voice UI profile required for initialisation is read at step 44, and the application is initialised at step 45. The operation 40 remains at step 46 until it is determined that execution of the application is required, when the execution of the application at the CPU 25 of the voice UI application server occurs at step 47. As with the embodiment described above with reference to FIG. 2, running the application includes using parts of the application which are appropriate to the voice UI profile, and thus to the MS 11, and refraining from using parts of the application which are inappropriate to the voice UI profile. Execution ends at step 48 once the application has finished running, and the operation then ceases at step 49.

Certain advantages arise from running or executing an application at the voice UI application server 24 instead of the MS 11. In particular, processing constraints of the MS 11 are not present at the server 24, which may therefore use the most advanced ASR available (the voice of the user of the MS 11 may be carried to the server over a voice channel). The voice UI profile is of particular interest when producing voice outputs to the user of the MS 11. For example, if the voice UI profile shows the MS 11 to have only pre-recorded prompt capabilities, the instructions included in the application which use the prompts stored at the MS are used. Alternatively or in addition, instructions included in the application which cause the transmittal of voice signals, generated by a TTS function at the server 24, are used. These voice signals may be carried over a voice channel. If, however, the voice UI profile shows the MS 11 to have full TTS capabilities, then instructions of the application which case the server 24 to send text signals to the MS, for synthesis thereat, are used or a VoIP channel. Alternatively, recognition is achieved using apparatus operating according to the distributed speech recognition principle.

As will be appreciated from the above, one application can be used on different MSs having numerous different voice UI capabilities. However, the fact that different capabilities need to be allowed for when developing an application introduces an increased number of possibilities of errors in a developed application. The emulator apparatus of FIG. 4 constitutes a development aid.

Figure 4:
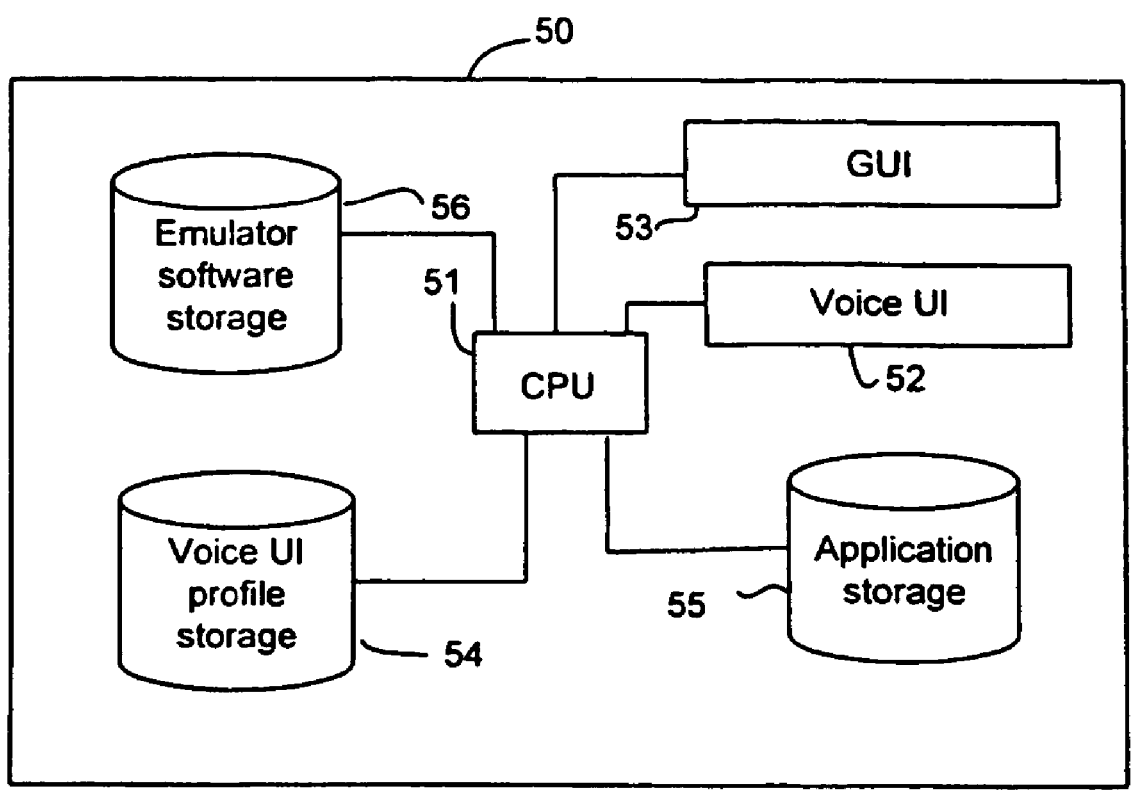
FIG. 4 is a schematic diagram of emulator apparatus according to certain aspects of the invention.

Referring to FIG. 4, the emulator 50 comprises a CPU 51, which is connected to each of a voice UI 52, a graphical user interface (GUI) 53, a voice UI profile storage device 54, an application storage device 55 and an emulator software storage device 56. Of course, the storage devices 55, 54 and 56 could form part of the same physical device, which could be RAM, EEPROM or magnetic storage for example. Operation of the emulator apparatus 50 in testing an application will now be described with reference to FIG. 5.

Figure 5:
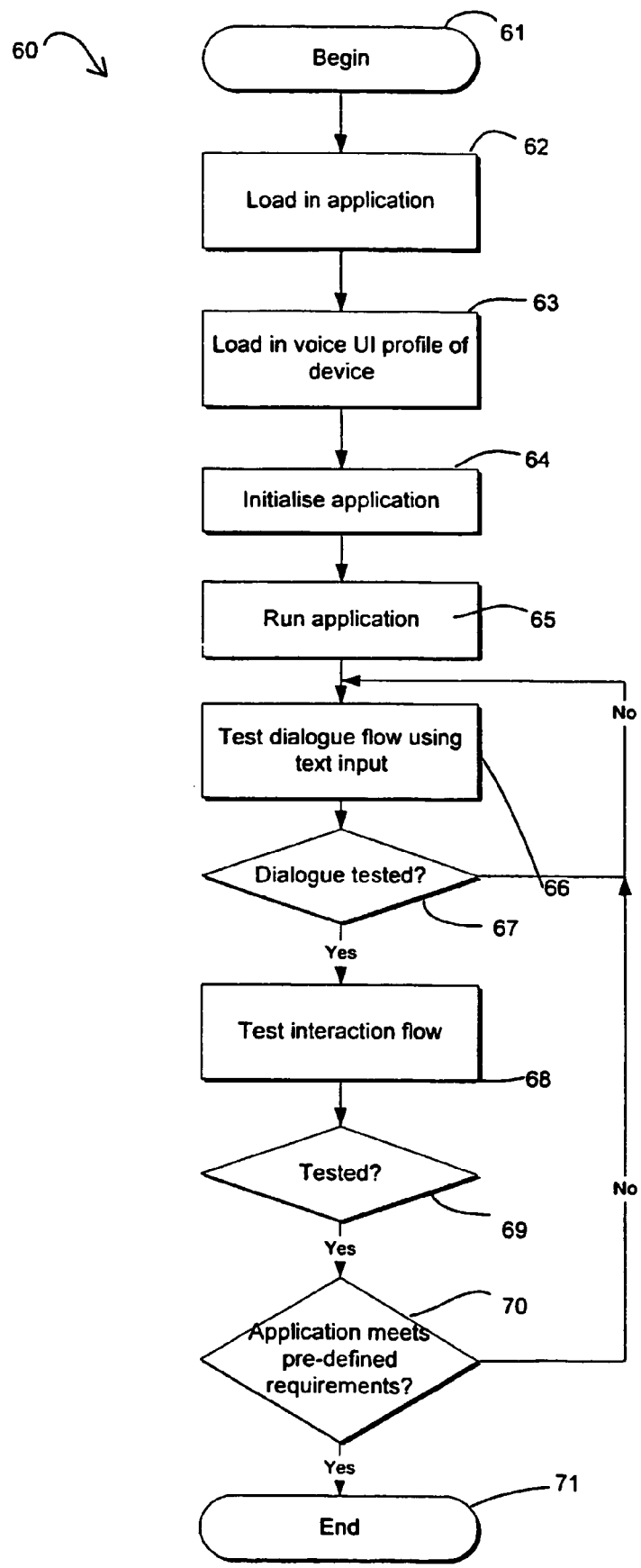
FIG. 5 is a flow chart illustrating operation of the emulator apparatus of FIG. 4.

Referring to FIG. 5, the operation 60 begins at 61, following which the application is loaded into the application storage device 55 at step 62. The voice UI profile of a notional device against which the application is being tested is then loaded into the voice UI profile storage device 54 at step 63. The application is then initialised, at step 64, using part of the voice UI profile, as described with reference to FIGS. 1 and 2, before being run or executed at step 65.

The aim of running the application is to test its operability. At step 66, the dialogue is tested. To avoid errors in other parts of the application affecting dialogue testing, step 66 is carried out using text inputs, which are provided by the emulator software stored in the emulator software storage device 56. Any response which differs to that expected is displayed using the GUI 53, along with an indication of the progress of the testing procedure. This allows the developer to check that the application responds properly to each possible input. When it is detected, at step 67, that the dialogue flow has been tested, the speech input and output features are tested at step 68. This step includes testing of the ASR aspects of the application including the vocabulary and grammar sections thereof and testing how the TTS module formulates system responses, and identifies what types of pre-recorded prompts are required. Once it is determined, at step 69, that the speech input and output features have been tested fully, the operation 60 proceeds to step 70, where a test is carried out to check that the application meets required standards. If a negative determination is made, the operation returns to step 66, thereby introducing iteration. Only once a positive determination is made at step 70 does the operation proceed to end at step 71. The decision of step 70 may be made by a human developer, or it may be automatic.

It will be appreciated that steps 66 and 68 involve the reading of voice UI capability information from the voice UI profile storage device 54, and that this information is used to run on the emulator apparatus 50 the parts of the application which are appropriate to the profile, and to refrain from running those parts of the application that, are inappropriate to the profile. This allows a developer to test an application against a target device, such as an MS having certain voice UI capabilities, with an indication given of any errors that might occur during the running of the application on the MS. Once the errors have been identified, the application can be modified by the developer, and the modified application tested using the emulator apparatus 50 and the operation 60. This iterative process concludes only once the developer is content that the application complies with the pre-defined requirements.

The invention claimed is:

1. A method performed by an apparatus, the method comprising:
   maintaining a profile of voice user interface capabilities associated with the apparatus, wherein the profile includes at least one setting related to voice interaction dialogue with a user, said at least one voice interaction dialogue setting including at least a speech recognition verification-related setting;
   storing an application having voice user interface features on the apparatus or downloading an application having voice user interface features from a server in communication with the apparatus;
   examining at least part of the profile; and
   using voice user interface features of the application which are appropriate to the profile and refraining from using inappropriate features;
   in which the stored application when executed responds to at least one user voice input with a query or a statement in dependence on the speech recognition verification-related setting.

2. A method as claimed in claim 1, further comprising prior to the using step: initializing the application using information included in the profile.

3. A method as claimed in claim 1, in which the maintaining step includes maintaining information relating to any combination of vocabulary, dialogue, automatic speech recognition and text-to-speech synthesis capabilities.

4. A method as claimed in claim 1, in which the maintaining step includes maintaining information relating to grammar capabilities, wherein the grammar capabilities comprise at least one of statistical and context free grammar capabilities associated with the device.

5. A method as claimed in claim 1, in which the using step includes referring to definitions forming part of the application, and using those definitions with at least part of the profile to determine which parts of the application are appropriate to the profile.

6. An apparatus, comprising:
   at least one processor; and
   at least one memory including computer program code and storing a profile of voice user interface capabilities; and
   the at least one memory and the computer program code configured to, with the at least one processor, cause the apparatus at least to:
   run an application using voice user interface features of the application which are appropriate to the profile and to refrain from using inappropriate features wherein the profile includes at least one setting related to voice interaction dialogue with a user, said at least one voice interaction dialogue setting including at least- a speech recognition verification related setting; and
   respond to at least one user voice input with a query or a statement in dependence on the speech recognition verification-related setting.

7. An apparatus as claimed in claim 6, in which the at least one memory and the computer program code are configured to, with the at least one processor, cause the apparatus at least further to use information included in the profile to initialize the application.

8. An apparatus as claimed in claim 6, in which the profile includes information relating to any combination of vocabulary, dialogue, automatic speech recognition and text-to-speech synthesis capabilities.

9. An apparatus as claimed in claim 6, in which the profile includes information relating to grammar capabilities, wherein the grammar capabilities comprises at least one of statistical and context-free grammar capabilities associated with the device.

10. An apparatus as claimed in claim 6, in which the at least one memory and the computer program code are configured to with the at least one processor, cause the apparatus at least further to refer to definitions forming part of the application, and to compare these definitions with at least part of the profile to determine which parts of the application are appropriate to the profile.

11. A system comprising:
    an apparatus having voice user interface capabilities; and
    a server, capable of communicating with the apparatus, the server being arranged to examine at least part of a profile voice user interface capabilities associated with the apparatus, and to run an application using voice user interface features of the application which are appropriate to the profile and to refrain from using inappropriate features, wherein the profile includes at least one setting related to voice interaction dialogue with a user, said at least one voice interaction dialogue setting including at least a speech recognition verification-related setting, and in which the stored application when run responds to at least one user voice input with a query or a statement in dependence on the speech recognition verification-related setting.

12. A system as claimed in claim 11, in which the server comprises an initializer, arranged to use information included in the profile to initialize the application.

13. A system as claimed in claim 11, in which the profile includes information relating to any combination of vocabulary, dialogue, automatic speech recognition and text-to-speech synthesis capabilities.

14. A system as claimed in claim 11, in which the profile includes information relating to grammar capabilities, wherein the grammar capabilities comprise at least one of statistical and context free grammar capabilities that are associated with the device.

15. A system as claimed in claim 11, in which the server is arranged to refer to definitions forming part of the application, and to use these definitions with at least part of the profile to determine which parts of the application are appropriate to the profile.

16. A method comprising:
at a first apparatus operative in a wireless communications network,
storing at the first apparatus an application the output of which is to be used by a second apparatus;
reading a voice user interface profile for the second apparatus, the voice user interface profile comprising at least a speech recognition verification-related setting, and in which the stored application when executed responds to at least one user voice input with a query or a statement in dependence on the speech recognition verification-related setting;
initializing the application;
detecting that execution of the application is required;
executing the application while reading relevant parts of the voice user interface profile on-the-fly, and
using appropriate parts of the voice user interface profile and refraining from using inappropriate parts of the voice user interface profile.

17. The method of claim 16 wherein the first apparatus is a base station operative in the wireless communications network.

18. The method of claim 16 further comprising:
determining that the voice user interface profile for the second apparatus is stored at the first apparatus.

19. The method of claim 16 further comprising:
determining that the voice user interface profile for the second apparatus is not stored at the first apparatus; and
uploading the voice user interface profile for the second apparatus to the first apparatus.

20. The method of claim 16 wherein the voice user interface profile includes at least one setting related to voice interaction dialogue with a user, said at least one voice interaction dialogue setting including at least the speech recognition verification-related setting.

21. An apparatus comprising:
a memory storing a program configured to operate the apparatus when executed and an application the output of which is to be used by another apparatus; and
a processor configured to execute the program, wherein when the processor executes the program operations are performed, the operations comprising:
read a voice user interface profile for the other apparatus, the voice user interface profile comprising at least a speech recognition verification-related setting, in which the program when executed responds to at least one user voice input with a query or a statement in dependence on the speech recognition verification-related setting;
initialize the application;
detect that execution of the application is required;
execute the application while reading relevant parts of the voice user interface profile on-the-fly, and
use appropriate parts of the voice user interface profile and refrain from using inappropriate parts of the voice user interface profile.

22. The apparatus of claim 21 wherein the apparatus is a base station operative in the wireless communications network.

23. The apparatus of claim 21 wherein the operations further comprise:
determine that the voice user interface profile for the other apparatus is stored at the apparatus.

24. The apparatus of claim 21 wherein the operations further comprise:
determine that the voice user interface profile for the other apparatus is not stored at the apparatus; and
update the voice user interface profile for the other apparatus to the apparatus.

25. The apparatus of claim 21 wherein the voice user interface profile includes at least one setting related to voice interaction dialogue with a user, said at least one voice interaction dialogue setting including at least the speech recognition verification-related setting.

* * * * *